(12) United States Patent
Berry et al.

(10) Patent No.: US 9,272,911 B2
(45) Date of Patent: Mar. 1, 2016

(54) PRODUCTION OF GRAPHENE NANORIBBONS WITH CONTROLLED DIMENSIONS AND CRYSTALLOGRAPHIC ORIENTATION

(76) Inventors: Vikas Berry, Manhattan, KS (US); Nihar Mohanty, Manhattan, KS (US); David S. Moore, Shawnee, KS (US)

(*) Notice: Subject to any disclaimer, the term of this patent is extended or adjusted under 35 U.S.C. 154(b) by 119 days.

(21) Appl. No.: 13/511,600

(22) PCT Filed: Nov. 22, 2010

(86) PCT No.: PCT/US2010/057593
§ 371 (c)(1),
(2), (4) Date: May 23, 2012

(87) PCT Pub. No.: WO2011/146090
PCT Pub. Date: Nov. 24, 2011

(65) Prior Publication Data
US 2012/0272868 A1 Nov. 1, 2012

Related U.S. Application Data

(60) Provisional application No. 61/264,141, filed on Nov. 24, 2009.

(51) Int. Cl.
*C01B 31/00* (2006.01)
*C01B 31/04* (2006.01)
*B82Y 30/00* (2011.01)
*B82Y 40/00* (2011.01)

(52) U.S. Cl.
CPC ............ *C01B 31/0469* (2013.01); *B82Y 30/00* (2013.01); *B82Y 40/00* (2013.01); *C01B 2204/065* (2013.01); *C01B 2204/22* (2013.01); *Y10T 428/2982* (2015.01)

(58) Field of Classification Search
CPC C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC .................................. 977/765, 734; 423/448
See application file for complete search history.

(56) References Cited

U.S. PATENT DOCUMENTS 3,803,958 A * 4/1974 Fernandez-Moran ............ 83/15
2005/0271574 A1 12/2005 Jang et al.
2006/0216222 A1 9/2006 Jang (Continued)

OTHER PUBLICATIONS

International Search Report and Written Opinion for PCT/US2010/057593, dated Dec. 27, 2011, 11 pages.

(Continued)

*Primary Examiner* — Melvin C Mayes
*Assistant Examiner* — James Corno
(74) *Attorney, Agent, or Firm* — Hovey Williams LLP

(57) ABSTRACT

Graphene particulates, especially graphene nanoribbons (GNRs) and graphene quantum dots (GQDs), and a high-throughput process for the production of such particulates is provided. The graphene particulates are produced by a nanotomy process in which graphene blocks are cut from a source of graphite and then exfoliated into a plurality of graphene particulates. Graphene particulates having narrow widths, on the order of 100 nm or less, can be produced having band gap properties suitable for use in a variety of electrical applications.

18 Claims, 9 Drawing Sheets

(56) References Cited

U.S. PATENT DOCUMENTS

| | | |
|---|---|---|
| 2009/0155578 A1 | 6/2009 | Zhamu et al. |
| 2009/0169467 A1 | 7/2009 | Zhamu et al. |
| 2009/0202787 A1* | 8/2009 | Hyldgaard et al. ........ 428/195.1 |
| 2009/0226361 A1 | 9/2009 | Campos-Delgado et al. |
| 2010/0056819 A1* | 3/2010 | Jang et al. ..................... 556/478 |
| 2010/0085713 A1* | 4/2010 | Balandin et al. .............. 361/705 |
| 2011/0190435 A1* | 8/2011 | Jang et al. ..................... 524/424 |
| 2012/0034707 A1* | 2/2012 | Datta ....................... B82B 1/00 436/501 |
| 2012/0211159 A1* | 8/2012 | Hougham et al. ............ 156/324 |

OTHER PUBLICATIONS

Barone, Veronica, et al., Electronic Structure and Stability of Semiconducting Graphene Nanoribbons, American Chemical Society, Nano Letters, 2006, pp. 2748-2754, vol. 6, No. 12.

* cited by examiner

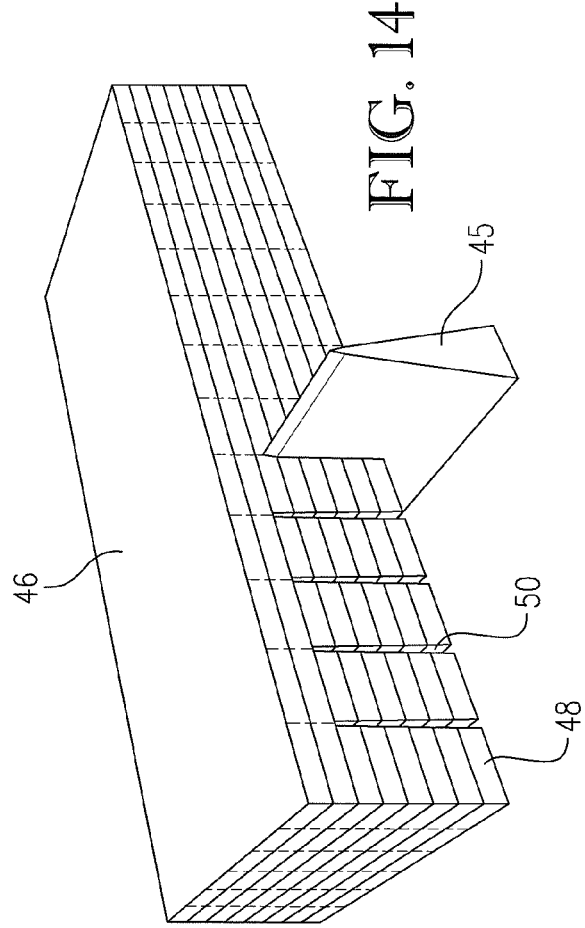
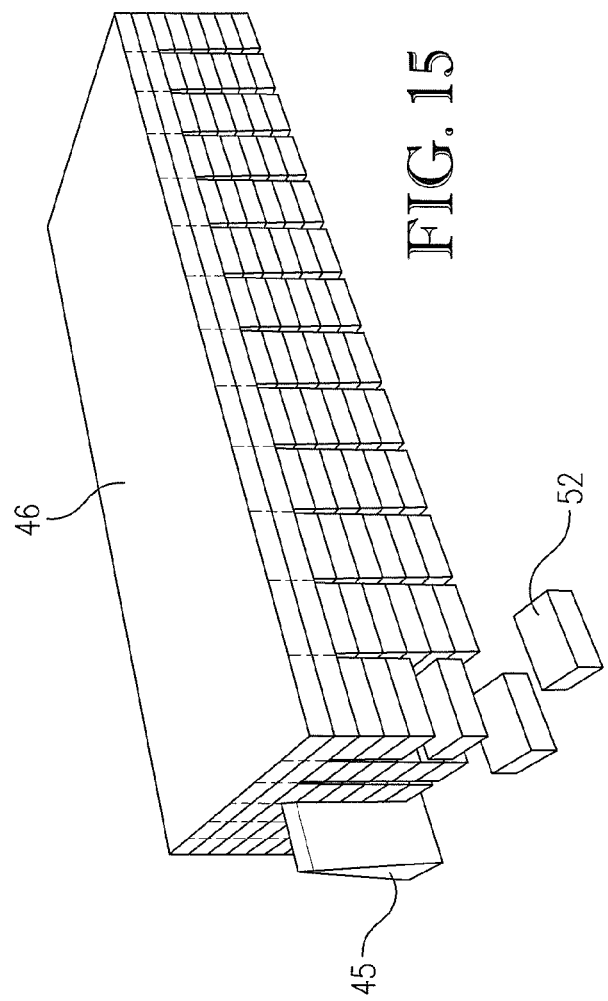

PRODUCTION OF GRAPHENE NANORIBBONS WITH CONTROLLED DIMENSIONS AND CRYSTALLOGRAPHIC ORIENTATION

RELATED APPLICATIONS

The present application is a national stage application under 35 U.S.C. 371 of International Application No. PCT/US2010/057593, filed 22 Nov. 2010, which claims the priority of U.S. Provisional Patent Application No. 61/264,141, filed, 24 Nov. 2009, both of which are incorporated by reference herein in their entireties.

STATEMENT REGARDING FEDERALLY SPONSORED RESEARCH OR DEVELOPMENT

This invention was made with U.S. Government support under grant number CMMI-0939523 awarded by the National Science Foundation. The Government has certain rights to the invention.

BACKGROUND OF THE INVENTION

1. Field of the Invention

The present invention is directed toward unique graphene particulates and a process for the high-throughput production of such particulates, especially graphene nanoribbons (GNR) and graphene quantum dots (GQD). The process permits a high level of control over the width and crystallographic orientation of the graphene particulates produced. These graphene particulates may be used in a number of applications including, but not limited to, high speed transistors, electronic devices, sensors (biological, physical, explosive etc), solar cells, optoelectronic devices, logic devices, ultracapacitors, actuators, coulomb blockade device, ultra-strong paper, field emission devices, transparent electrodes, conductive pastes, and optical/fluorescent devices.

2. Description of the Prior Art

Generally, graphene is a monolayer of carbon atoms tightly packed into a two-dimensional honeycomb lattice and is a basic building block for graphitic materials of all other dimensionalities. Graphene nanoribbons are single atom thick strips of $sp^2$ hybridized carbon atoms that exhibit width and edge dependent band gap, scalar potential-mediated coupling of states in distinct bands, and room temperature ballistic transport.

In solid state physics, a band gap, also called an energy gap, is an energy range in a solid where no electron states can exist. In graphs of the electronic band structure of solids, the band gap generally refers to the energy difference (in electron volts) between the top of the valence band and the bottom of the conduction band in insulators and semiconductors. This is equivalent to the energy required to free an outer shell electron from its orbit about the nucleus to become a mobile charge carrier, able to move freely within the solid material. Intrinsic graphene is a semi-metal or zero-gap semiconductor. It has been discovered that a band gap can be produced in graphene by reducing the width of the material, particularly if the width can be reduced to a nanosized range. The lateral quantum confinement of the electron wave-functions and edge effects in the narrow GNRs, result in opening up of a finite energy gap. The semiconducting nature of sub-10 nm wide GNRs, both zigzag and armchair configurations, and the slightly wider armchair edged GNRs having widths of between 15-90 nm have shown potential for use in nanosized electronic devices. However, realization of this potential is dependent upon being able to produce GNRs with precise and reproducible dimensions at high throughput.

Several processes have been devised for GNR fabrication including lithography based methods, chemical and sonochemical methods, and the unzipping of carbon nanotubes (CNTs). However, achieving high throughput fabrication of GNRs with pre-determined widths using these processes is challenging. Lithographic methods of fabrication include on-substrate etching of a single large graphene sheet to obtain GNRs. Specifically, these lithographic methods include electron beam lithography, which has been used to create GNRs having a minimum width of 26 nm, and plasma etching with nano-rod masks and scanning-tunneling-microscopy. These lithographic methods have extremely low throughput.

GNRs can be produced through chemical and sonochemical methods such as through the ultrasonication of graphite in $KMnO_4$ and $H_2SO_4$ solution and chemical vapor deposition from carbonaceous compound aerosols. The GNRs produced through ultrasonication of graphite are randomly sized and shaped, and the method provides no control on width or crystallographic orientation. Chemical vapor deposition provides limited control over GNR width (>20 nm) and no control on crystallographic orientation. Thus, both of these methods produce a broad distribution of GNR widths.

GNRs also can be produced through the unzipping of CNTs via chemical processes and through the etching of CNTs via an oxygen plasma process. The unzipping of CNTs via chemical processes produces GNRs at high-throughput. However, owing to the use of multi-walled carbon nanotubes (MWCNTs) in the unzipping strategy, the GNRs produced have a broad distribution of widths corresponding to the nanotubes' outer and inner circumferences. Further, because the unzipping process is oxidative in nature which leaves oxy-functional groups on the ribbons, production of pristine or non-functionalized GNRs cannot be realized through this method. The oxy-functional groups produce scattering sites on the graphene ribbons significantly reducing the carrier mobility, which is important for transistor applications of GNRs. Further, the oxy-groups change the $sp^2$ hybridization of the carbons to $sp^a$, thus undesirably removing the pi-electrons density in GNRs. Etching of CNTs via an oxygen plasma process is a low throughput process.

Thus, there is a need for a method to enable production of controlled-width graphene nanoribbons at high-throughput.

SUMMARY OF THE INVENTION

In one embodiment according to the present invention there is provided a composition comprising a plurality of unaffixed graphene particulates that are relatively uniform in at least one dimension. In particular embodiments, at least 90% of the graphene particulates have widths that are within ±3 nm from the mean width of the plurality of graphene particulates.

In another embodiment according to the present invention there is provided a composition comprising a plurality of unaffixed graphene particulates that are in relatively pristine condition and have widths of less than 10 nm. In one aspect, the pristine nature of the graphene particulates is such that the particulates comprise less than 1 epoxy, carboxylic, or hydroxy functional group per 100 square nanometer.

In still another embodiment according to the present invention there is provided a method of producing a plurality of graphene particulates from a source of graphite. First, a plurality of graphite blocks is cut from a source of graphite. Second, the plurality of graphite blocks are exposed to an acid, such as a superacid, thereby causing the graphite blocks to exfoliate into a plurality of graphene particulates.

BRIEF DESCRIPTION OF THE DRAWINGS

FIG. 14 is a schematic illustration of the cutting slits in a source of graphite in a method for producing GQDs in accordance with one embodiment of the present invention;

FIG. 15 is a schematic illustration of the cutting of GNBs from a previously-silted source of graphite in a process for producing GQDs;

DETAILED DESCRIPTION OF THE PREFERRED EMBODIMENT

According to one embodiment of the present invention, a diamond knife-based nanotomy process is utilized for large scale production of high quality, smooth edged graphene particulates. Generally, nanotomy is the process of cutting slices of material having nanosized thicknesses. Ultramicrotomes have previously been used for cutting nano-slices of biological cells for TEM imaging. Parameters in the nanotomy process that can be controlled include the cutting speed, rake angle, sample orientation, cutting temperature, and internal angle of the knife. In certain embodiments of the invention described herein, the diamond knife, having an edge radius of about 1 to 5 nm and an internal angle of 35° or 45°, is mounted on an ultramicrotome, which can achieve a cutting step-size of 1 nm.

Processes according to the present invention can produce graphene particulates having a number of geometries, including graphene nanoribbons (GNRs) and graphene quantum dots (GQDs). Generally, GNRs are thin strips of graphene. While the lengths of GNRs can vary depending upon the dimensions of the graphene nanoblocks (GNBs) from which they are created, in certain embodiments according to the present invention, GNRs have mean widths of less than 100 nm, or less than 50 nm, or less than 25 nm, or less than 10 nm. In other embodiments, the GNRs have mean widths of between about 1 to about 100 nm, or between about 2 to about 50 nm, or between about 5 to about 10 nm.

Generally, GQDs are graphene-based nanocrystalline structures. GQDs can present themselves in a variety of geometric shapes such as circles, rectangles, squares, and triangles. In certain embodiments, the GQDs have mean diameters, lengths, widths, or altitudes of less than 100 nm, or less than 50 nm, or less than 25 nm, or less than 10 nm. In other embodiments, the GQDs have mean diameters, lengths, widths, or altitudes of between about 1 to about 100 nm, or between about 2 to about 50 nm, or between about 5 to about 10 nm.

These geometries are achieved through various cutting methods, which are described in detail below. The graphene particulates are derived from a source of graphite that is cut into GNBs. In certain embodiments, the source of graphite is highly oriented pyrolitic graphite (HOPG), which is a material that comprises many atomic layers of carbon highly oriented among each other (i.e., having an angular spread of the c-axes of the crystallites of less than 1 degree). The graphite source, especially HOPG, can be used in processes according to the present invention to produce graphene particulates with controllable edge crystallography, zigzag, armchair, or combinations of both.

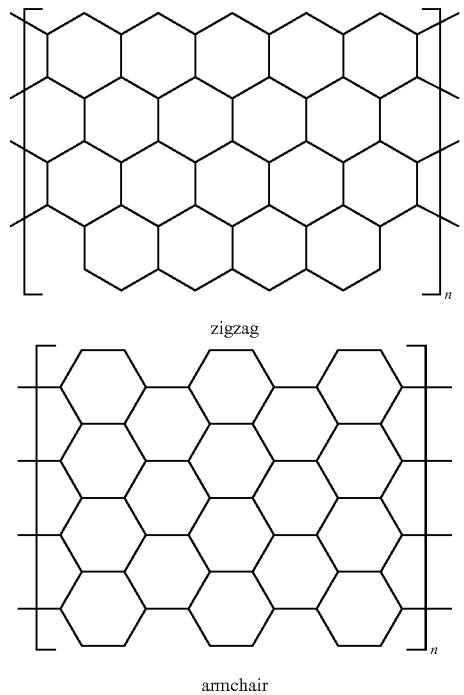

zigzag armchair

Figure 4:
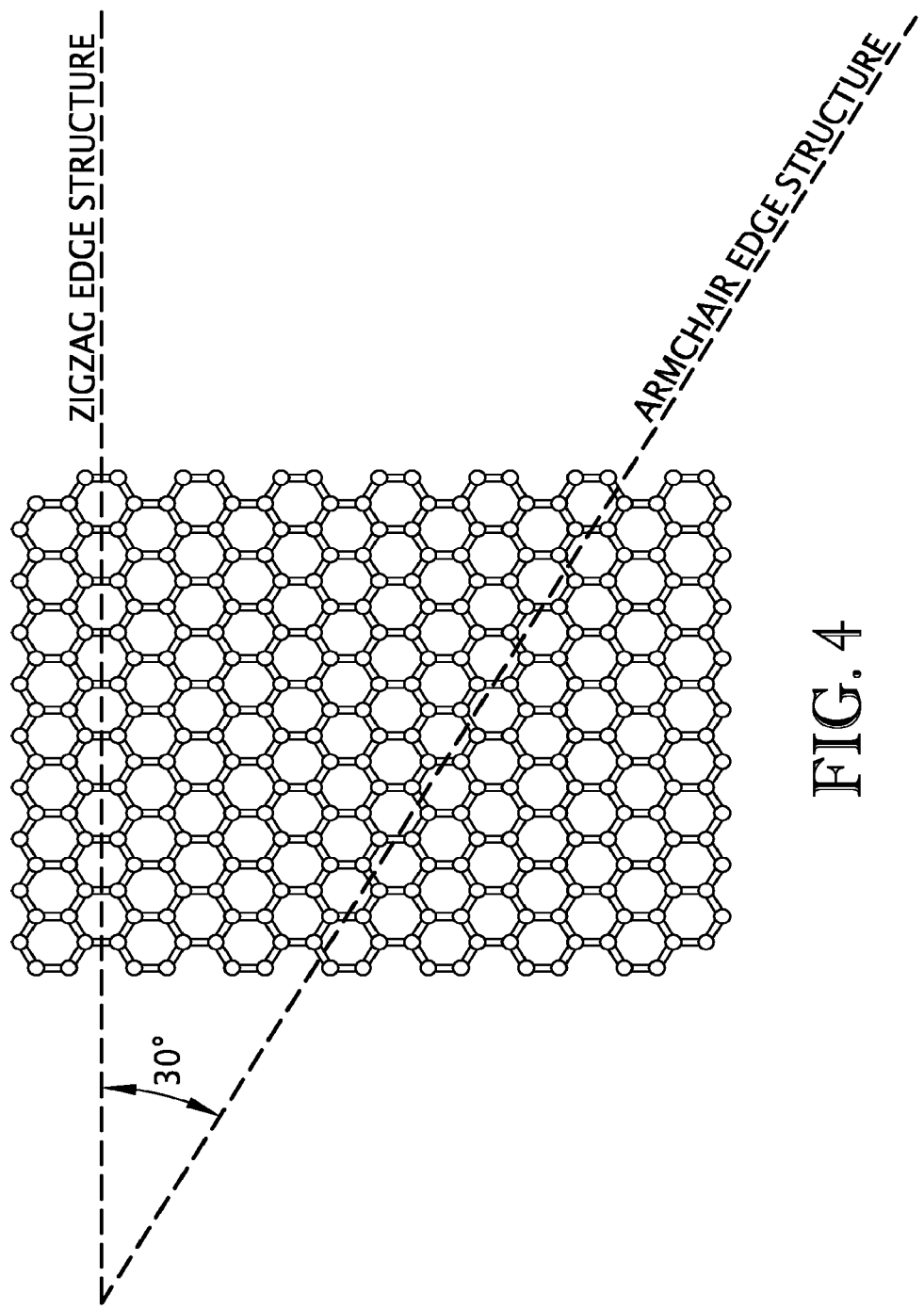
FIG. 4 is a depiction of the angle between the metallic and semiconducting domains on the graphene's $sp^2$ honeycomb lattice, corresponding to the "zigzag" and "armchair" chiralities.

Similar to carbon nanotubes, the angle between the metallic and semiconducting domains on the graphene's sp² honeycomb lattice, corresponding to the "zigzag" and "armchair" chiralities, respectively, is expected to be 30°, see FIG. 4. If the graphite source, especially HOPG, is defect free and has no grain boundaries, its orientation can be determined by STM or EBSD studies. The graphite source then can be cut into GNBs at angles corresponding to those which produce graphene particulates with the desired crystallographic orientation. Such control over crystallographic orientation has not been achieved previously as the prior art methods of synthesizing GNRs discussed above produce GNRs having a mixture of different orientations.

GNBs are nanosized structures derived from a source of graphite, such as HOPG. The dimensions of the GNBs can be based upon the starting dimensions of the graphite source, or can be custom cut to any desired size through the nanotomy process. In certain embodiments the graphite blocks, or GNBs specifically, are cut so that at least one dimension is less than 100 nm, or less than 50 nm, or less than 25 nm, or less than 10 nm. In other embodiments, the GNBs have widths of between about 1 to about 100 nm, or between about 2 to about 50 nm, or between about 5 to about 10 nm.

The GNBs are then exfoliated into the graphene particulates. In certain embodiments according to the present invention, the exfoliation is performed by exposing the GNBs to an acid, especially a superacid, which cleaves the pi bonds between adjacent graphene layers making up the GNBs. Superacids are acids with acidity (measured by Hammett function, $H_0$) greater than 100% sulfuric acid ($H_0=-12$). Addition of the superacid results in protonation of the graphite's graphenic clouds, and the intergraphene interfacing is lost leading to exfoliation of the graphene sheets. The positive charge from the protonation keeps the suspended sheets apart and stretched in the superacid. Diluting this suspension in water (1:200) stabilizes protonated graphene in water for 4-5 days. A basic solution, such as an NaOH wash, can be employed to deprotonate the sheets. In certain embodiments the superacid is selected from the group consisting of superacids, such as chlorosulfonic acid ($HSO_3Cl$, $H_0=-14$), and mixtures of superacids. It is also within the scope of the present invention for surfactants to be used such as pyrenecarboxylic acid (PCA) and solvents such as N-methyl-pyrrolidone, N,N-dimethylacetamide, γ-butyrolacetone and 1,3-dimethyl-2-imidazolidinone. The superacid which is added to the GNBs may be provided in a sulfuric acid solution at a concentration of at least 75%, or at least 85%, or at least 90%.

In certain embodiments according to the present invention, the graphene particulates created according to the methods described herein have a high degree of uniformity. In particular embodiments, graphene particulate compositions are provided in which at least 90%, or 95%, or 99% of the graphene particulates have widths within +3 nm from the mean width of the graphene particulates. In other embodiments, at least 90%, or 95%, or 99% of the graphene particulates have widths within ±2 nm, or even ±1 nm from the mean width of the graphene particulates.

The methods disclosed herein are also able to fabricate graphene particulates having mean widths of less than 10 nm. In such embodiments, by altering the cutting angle between the diamond knife and graphite source, the GNBs can be cut into wedge shapes. In particular embodiments, the wedge-shaped GNBs can have a wide end with a width of 10 nm or less and a substantially smaller narrow end on the order of about 2 nm, for example. The wedge-shaped GNBs can then be exfoliated to provide a plurality of graphene particulates that have a mean angle of width of less than 30°, at a resolution of 1°.

In certain embodiments, particularly those embodiments in which GQDs are produced, it may be necessary to cut the source of graphite using the ultramicrotome, or nanotome, in more than one direction. These directionally different cuts can be made by rotating the source of graphite following cutting of the graphite in a first direction. To assist with this process, and in order to increase the dimensional stability of the source of graphite, the source of graphite, especially HOPG, may be encased in a wax mold. Upon separation of the graphite blocks from the source of graphite, at least some of the plurality of graphite blocks may comprise a portion of the wax mold adhering thereto. This wax mold should be removed prior to exfoliation of the graphite blocks into the graphene particulates. The wax mold can be removed by heating the graphene blocks so as to evaporate the wax.

The methods of fabrication described herein are capable of producing pristine or nearly pristine graphene particulates. This is to say, that unlike certain prior methods of fabrication, the graphene particulates comprise few, none, or substantially no oxy or hydroxy functional groups. In particular embodiments, the graphene particulates comprise less than 1 oxy functional groups per 100 square nanometer of the particulate surface.

Also, the methods of fabrication described herein permit the graphene particulates to be provided in an unaffixed state. By "unaffixed" it is meant that the graphene particulates need not be adhered or attached to, mounted or provided upon any particular substrate, such as a silicon or silica-based substrate. As described previously, various prior lithographic means of fabricating GNRs required that etching occur on a substrate. Being affixed to a substrate can hinder the utility of the GNRs. With the present invention, the graphene particulates are not encumbered in such a manner. The graphene particulates can be synthesized and provided in a free-flowing or unaffixed form thereby permitting the particulates to be used in a variety of applications in situ or remote from the precise locale of manufacture. In certain embodiments, a plurality of graphene particulates is provided in dry powder form.

In certain embodiments, the graphene particulates can be dispersed in a fluid. The fluid in which the graphene particulates are dispersed can be selected from the group consisting of water, dimethylformamide (DMF), chloroform, dichloro methane, dichloro ethane, methanol, and mixtures thereof. While the graphene particulates may be provided at any desired concentration, in particular embodiments, the graphene particulates are present in the dispersion at a level of at least 0.1% by weight, or between about 0.1 to about 5% by weight, or between 0.5 to 3% by weight, or about 2% by weight, based upon the weight of the entire dispersion.

In still other embodiments, the graphene particulates can be processed into conductive films. In one aspect, the graphene particulate films can be formed by filtering the aforementioned graphene dispersions, especially GNR-comprising dispersions, to produce a layer of particulates. The layer of graphene particulates can then be baked in order to bond or solidify the contacts between adjacent particulates.

In certain embodiments, the graphene particulates can be functionalized with a particular functional group, material, or compound so as to impart a specific property. In particular embodiments, the graphene particulates can be functionalized with one or more member selected from the group consisting of proteins, DNA, RNA, gold, ethylene diamine, methyl amine, carbonyl amine, and other carbonyls. In particular embodiments, functionalization of graphene can be achieved using Hummers method. In this process, $H_2SO_4$ and $KMnO_4$ are used to induce carboxylic-acid functionalization of graphene. These oxy-functional groups may be used to attach the aforementioned materials to the graphene. Graphene can also be directly functionalized with carbonyls without using the Hummers method.

EXAMPLES

The nanotomy process for forming graphene particulate materials in accordance with certain embodiments of the present invention is discussed in the following examples. It is to be understood, however, that these examples are provided by way of illustration and nothing therein should be taken as a limitation upon the overall scope of the invention.

Example 1

GNR Formation

In this example, a high-throughput strategy for GNR production from HOPG blocks is discussed. The strategy employs diamond-knife based cleaving of the HOPG along the plane perpendicular to the graphene planes to produce narrow GNBs. Each GNB is ~1 mm thick, ~3 mm long and comprises millions of columnar-stacked GNRs with similar dimensional and crystallographic edge structure, which can be exfoliated to form GNRs with congruent properties. This leads to a narrow width distribution of ~3-10 nm standard deviation for GNRs produced in ~50 cutting cycles for the modal width of 30-70 nm. The width of the GNRs is predeterminable between ~5 nm and ~1000 nm in steps of 1 nm, with the lower limit depending on the nanotome used and the diamond knife parameters. The set up used in the present example was for widths of ~5-600 nm in ~5 nm steps with typical knife radius of ~5 nm.

Figure 1:
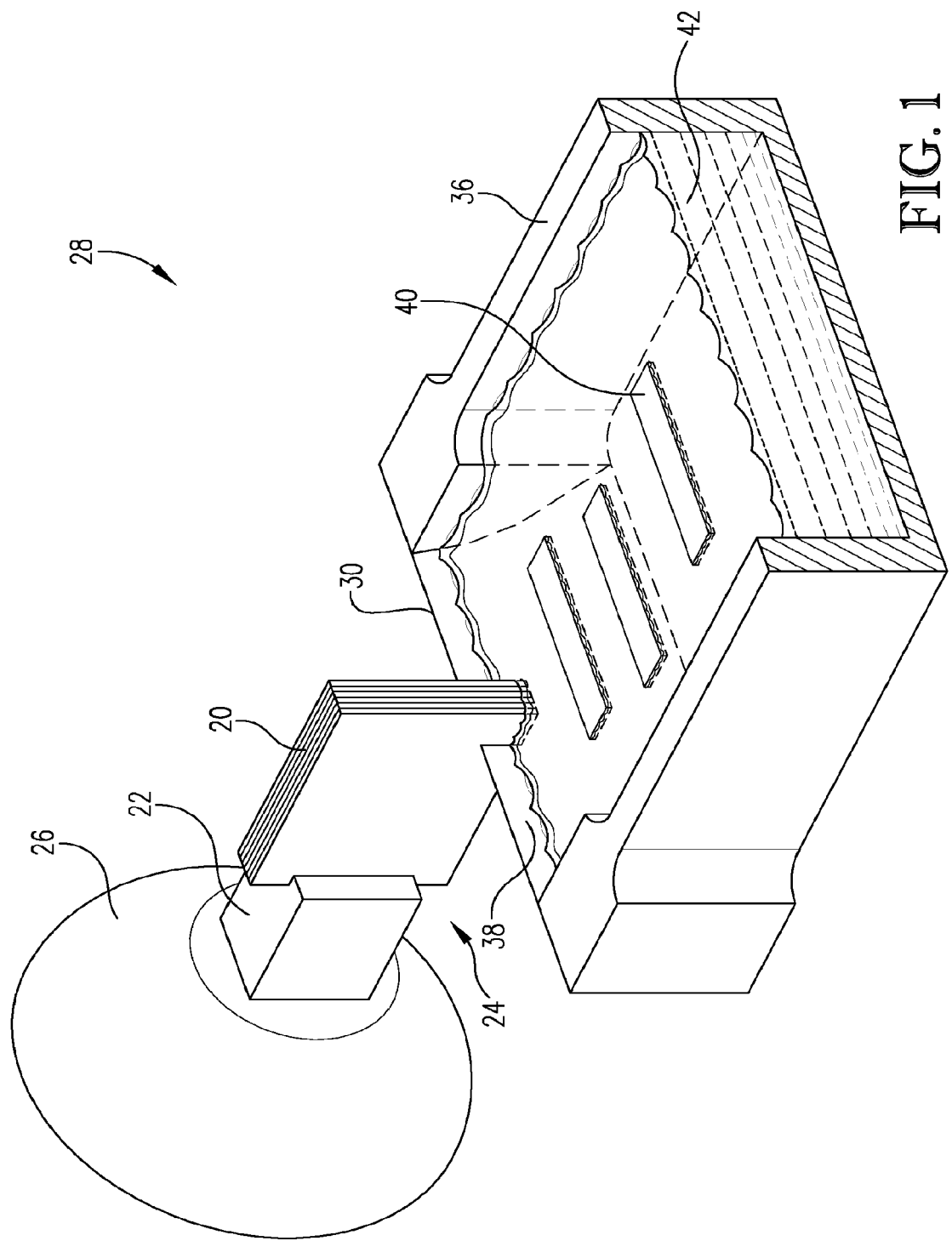
FIG. 1 is a schematic illustration of a ultramicrotome apparatus used in the manufacture of graphene particulates in accordance with one embodiment of the present invention.
Figure 2:
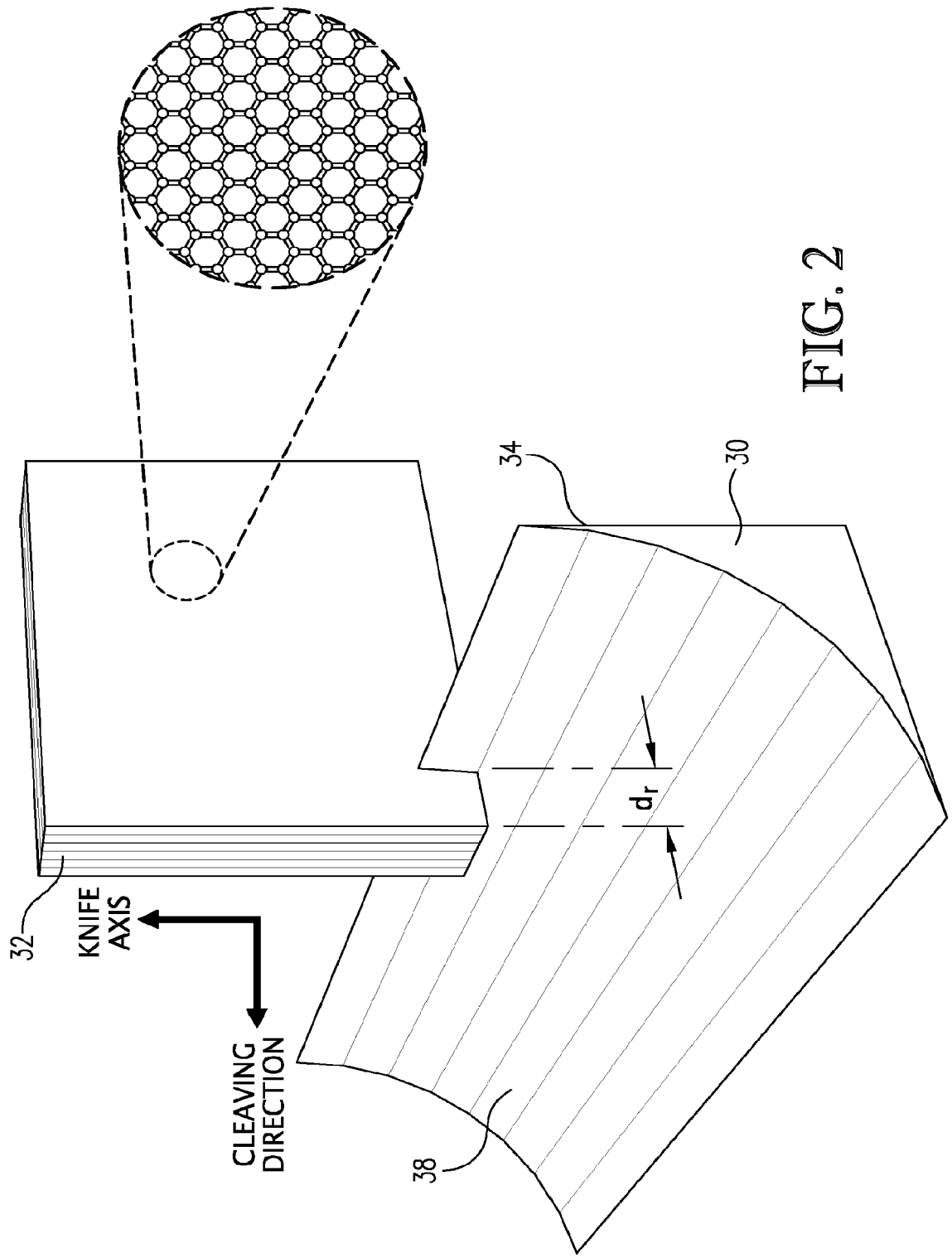
FIG. 2 is a close up schematic illustration of the cutting of GNBs from a source of graphite.

With reference to FIG. 1, a 7×7×1 mm HOPG block 20 (AB stacking, Grade 2, SPI Inc.) was affixed onto a cuboidal piece of hardened araldite resin 22 using super glue (cyanoacrylate adhesive) and allowed to dry completely for about an hour at room temperature. The resin-HOPG block 24 was firmly mounted on the sample holder 26 of a nanotome 28 (PT-XL Microtome, Boeckeler Instruments Inc.). Following mounting of resin-HOPG block 24 on sample holder 26, the HOPG block 20 was aligned with the edge of the ultra-sharp diamond knife 30 (DuPont Inc., 45' included angle) so as to have a 5° clearance angle, 40° rake angle and an specific angle, $\Lambda_v$, between the plane of the leading edge 32 of the HOPG block and the knife edge 34. Leading edge 32 and knife edge 34 are shown in FIG. 2. The angle between the plane of the leading edge 32 of the HOPG block and the knife edge 34 was adjusted on nanotome 28 such that $\Theta_v=0°$ was used throughout this example in order to maximize the GNR output by utilizing the full cross section of the cuboidal HOPG block for the cleavage. The water level on the knife boat 36 was adjusted to have a 30-45° angle of contact with the knife edge 38. With a specific sample-forward step size ($d_r$) and a specimen-arm speed of 0.4 mm/sec in the cleaving cycle, the HOPG block 20 was cleaved repeatedly to obtain the graphene nanoblocks 40 (GNBs) dispersed in the water 42. The GNB dispersion in water was collected in clean tubes and heated at 100° C. under an ultra high pure (UHP) argon atmosphere (20 psi) for 1 hour to evaporate all the water in order to obtain the dry GNBs 40.

Figure 3:
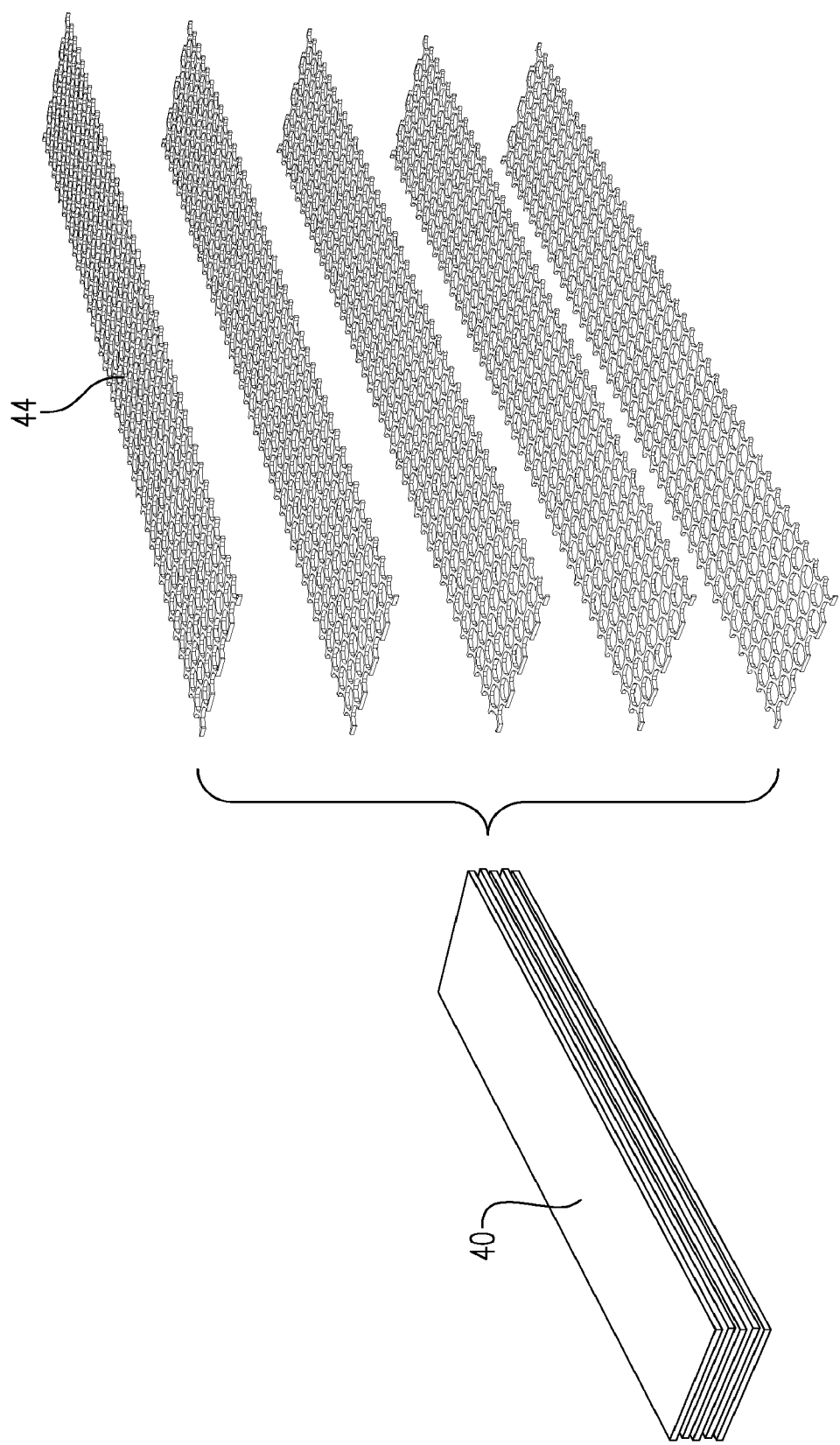
FIG. 3 is a schematic illustration of the exfoliation of GNBs into GNRs in accordance with one embodiment of the present invention.

The GNBs were exfoliated by a variety of strategies including superacid-based exfoliation utilizing chlorosulfonic acid (SE), Hummer's acid exfoliation (HE), and PCA-based exfoliation (PE). For the PCA based exfoliation, the GNBs and PCA were mixed in methanol. The mixture was sonicated for 8 hours. In this process, the PCA forms a pi-bonded monolayer on the graphene surface and the acid's negative charge stabilizes the sheets in methanol or water. For the superacid based exfoliation, ~100 GNBs were dispersed in 2 ml of 99% chlorosulfonic acid and placed on a shaker for 8 hours. The GNB dispersions were subsequently quenched in water (1:200) to obtain the exfoliated GNRs 44. Here the yield is high and the GNR surface does not have any pi-bonded compounds. The exfoliation is schematically illustrated in FIG. 3.

Figure 7:
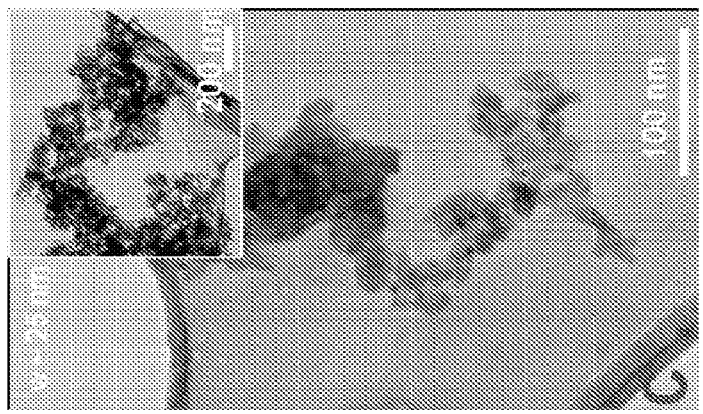
FIG. 7 is a high magnification TEM image of ~25 nm wide GNRs produced in accordance with one embodiment of the present invention.
Figure 6:
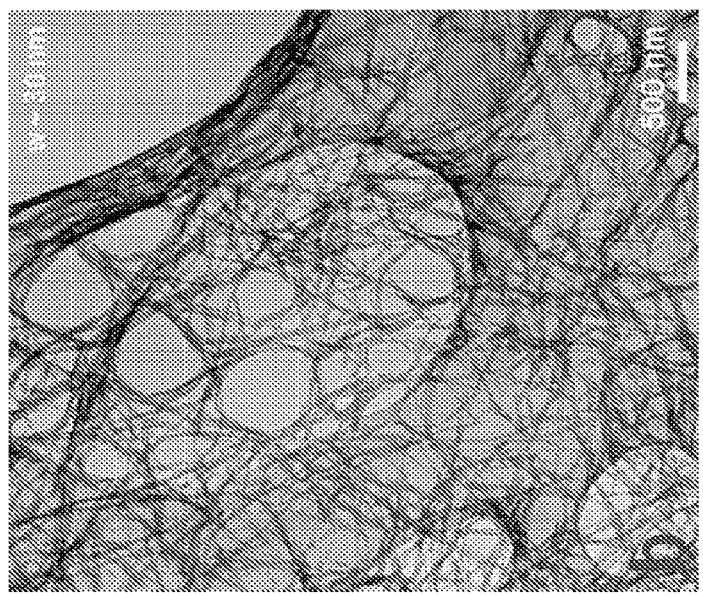
FIG. 6 is a low magnification TEM image of 30 nm wide GNRs produced in accordance with one embodiment of the present invention.
Figure 5:
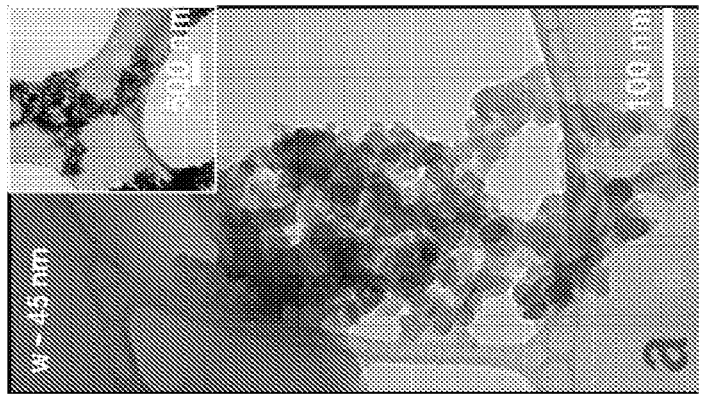
FIG. 5 is a high magnification TEM image of 45 nm wide GNRs produced in accordance with one embodiment of the present invention.
Figure 10:
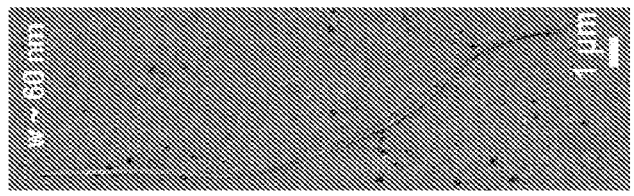
FIG. 10 is an FESEM image of 60 nm wide GNRs produced in accordance with one embodiment of the present invention.
Figure 9:
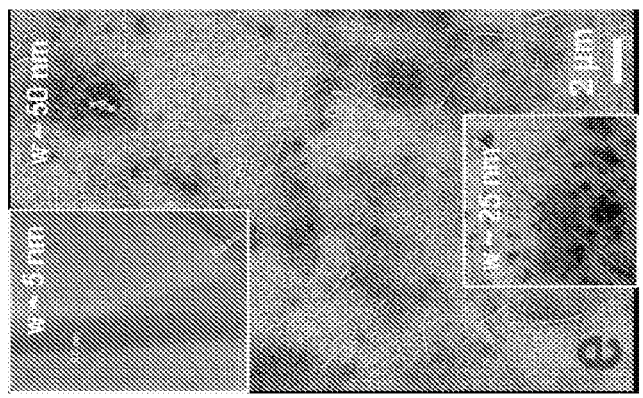
FIG. 9 is an FESEM image of 50 nm wide GNRs produced in accordance with one embodiment of the present invention and immobilized on a silica substrate.
Figure 8:
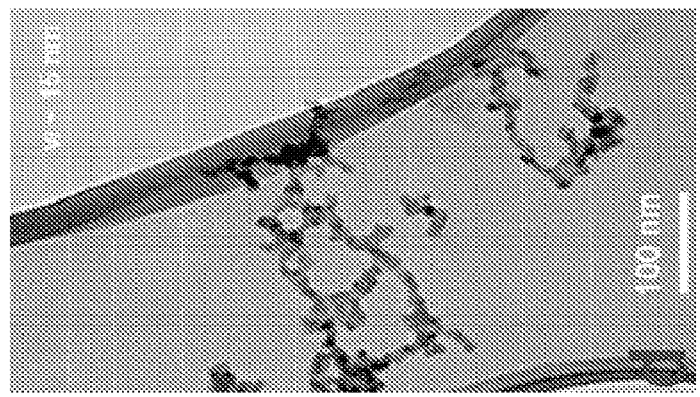
FIG. 8 is a high magnification TEM image of ~15 nm wide GNRs produced in accordance with one embodiment of the present invention.
Figure 13:
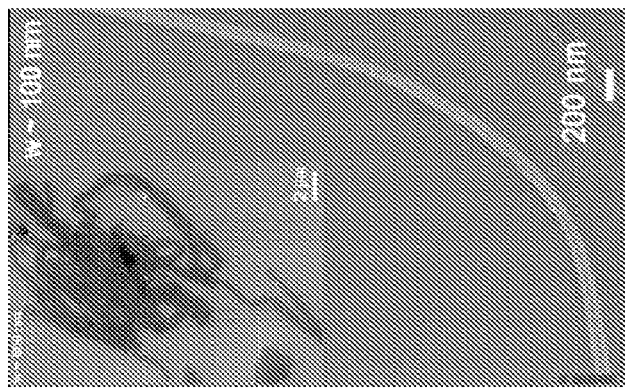
FIG. 13 is an FESEM image of a ~100 nm wide GNR produced in accordance with one embodiment of the present invention.
Figure 12:
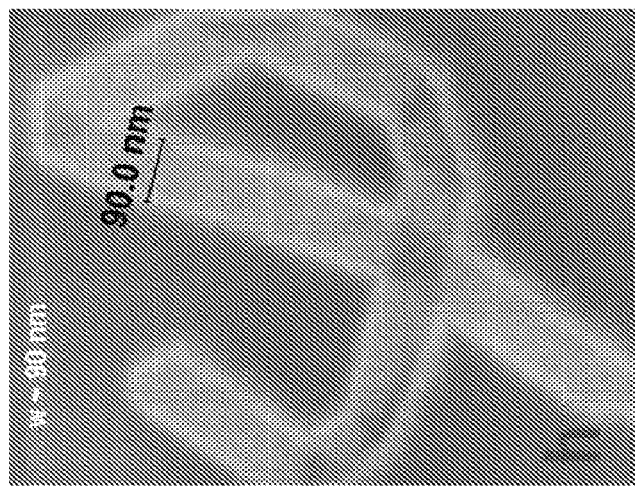
FIG. 12 is an FESEM image of 90 nm wide GNRs exfoliated using the PE technique.
Figure 11:
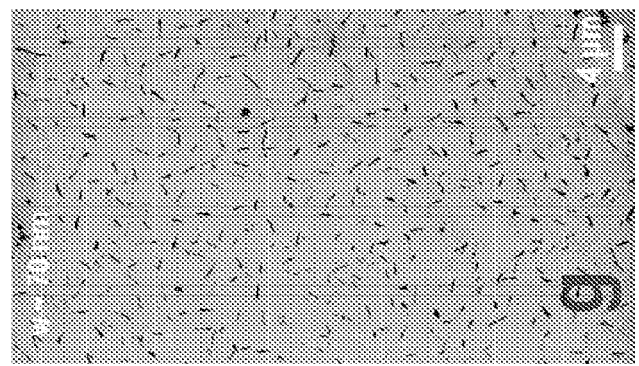
FIG. 11 is an FESEM image of 70 nm wide GNRs produced in accordance with one embodiment of the present invention.
Figure 17:
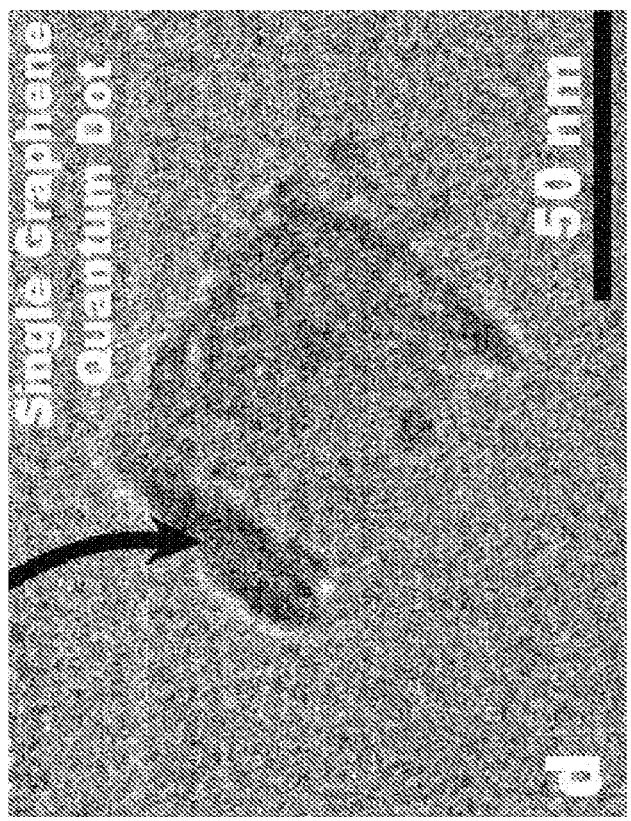
FIG. 17 is a TEM image of a single square GQD produced in accordance with one embodiment of the present invention.

Field emission scanning electron microscopy (FESEM) and transmission electron microscopy (TEM) were used to characterize the as-produced GNRs templated on 300 nm thick silicon dioxide wafers or immobilized on 300 mesh lacy carbon TEM grids, respectively. FIGS. 5-13 are photographs of assorted transmission electron microscope (TEM) and field emission scanning electron microscope (FE-SEM) images of the GNRs. FIG. 5 is a high magnification TEM image of the ~45 nm wide GNRs exfoliated using the SE technique. The inset of FIG. 5 shows a low magnification image of the same sample vindicating the reproducibility and efficiency of the GNR production strategy. FIG. 6 is a low magnification TEM image of the ~30 nm wide GNRs exfoliated using the HE technique. FIG. 7 is a high magnification TEM image of the ~25 nm wide GNRs exfoliated using the SE technique. The inset of FIG. 7 shows a low magnification image of the same sample. FIG. 8 is a high magnification TEM image of the ~15 nm wide GNRs exfoliated using the SE technique. FIG. 9 is an FESEM image of ~50 nm wide GNRs exfoliated using the PE technique and immobilized on a silica substrate. The inset of FIG. 9 shows the ~5 nm and 6.5 nm wide GNRs exfoliated using the HE technique. FIGS. 10-12 are FESEM images of ~60 nm, ~70 nm, and ~90 nm wide GNRs exfoliated using the PE, HE, and PE techniques, respectively, immobilized on a silica substrate. FIG. 13 is an FESEM image of a ~100 nm wide GNR exfoliated using the PE technique. The inset of FIG. 10 shows an ultra-long coiled GNR, ~600 nm wide, exfoliated using the HE technique, and immobilized on a silica substrate.

In addition to attesting to the uniformity and the smoothness of the GNR edges in the longitudinal direction, the assortment of the FESEM/TEM images show the versatility of the synthesis strategy in pre-determining the width of the GNRs from ~5 nm to 600 nm. High resolution transmission electron microscopy (HR-TEM) was also used to measure the width and to characterize the edge crystallography of a 10 nm wide GNR deposited on lacey carbon grids. The GNR was found to have a uniform width over its length and smooth edges. The diffraction pattern from the GNRs showed the crystallographic signature of the honeycomb graphitic lattice.

The thinnest ribbons produced by this setup had a width of 5 nm (corresponding to the minimum $d_r$ possible for the nanotome and the knife edge radius), see FIG. 9, top inset. It is believed that the quality of the GNRs as well as the reproducibility thereof can be further improved by reducing the environmental vibration, using knives with 35° knife angle, and through the use of ultrasonic knives. Further, by changing the $\Theta_v$ by 30°, GNRs can be produced with a different edge structure. For example, the production of GNRs having a zigzag edge structure can be changed to the production of GNRs having an armchair edge structure by adjusting $\Theta_v$ by 30°.

With its automatic sample feed at a preset $d_r$, the nanotome process is amenable to large scale synthesis of fixed width GNRs. In one particular embodiment, $10^{14}$ GNRs can be produced per hour, per HOPG block, per nanotome, which is significantly higher than all presently known methods for fabricating narrow nanoribbons.

Further, it was discovered that a faster cleaving speed or a higher specimen-arm velocity (SAV) increases the roughness of the edges as deduced from a higher Raman $I_D/I_G$ ratio (~0.83 for fast compared to ~0.25 for slow) measured for bilayer GNRs. In this experiment, the maximum SAV that produced smooth edges was ~0.4 mm/sec. Since the GNBs are collected in the knife boat containing DI water, controlling the angle of contact (~30-45°) between the DI water and the knife edge is important to efficiently collect the cleaved GNBs, since a lower or higher contact angle causes GNBs to build up on the knife edge.

Example 2

GQD Formation

In this example, an HOPG block was cut into nanoblocks and exfoliated to produce GQDs. Initially, the HOPG block is incorporated into wax mold to provide structural stability. As in Example 1, the HOPG block was rigidly attached to an araldite-resin-block using a cyanoacrylate adhesive, which is then firmly mounted on the sample holder of an ultramicrotome. The sample is precisely aligned along the edge of the diamond knife at a 5° clearance angle, and 40° rake angle (angle between the plane of the leading edge of the knife and the perpendicular to the HOPG face). As illustrated in FIG. 13, using the highly-aligned, ultra-sharp diamond-knife 45 with ~1-2 nm edge radius (RMC Inc.), the HOPG-wax mold 46 was repeatedly cut ~0.5 mm deep, while moving forward in small steps. This produces a plurality of substantially parallel rows 48 separated by slits 50. The step-size can be set between 10 nm and 100 nm with 1 nm resolution. As shown in FIG. 14, the mold 46 was then rotated 90° and cut again in a similar manner to produce graphite nanoblocks 52 (GNBs). The wax-mold was then evaporated by heating at 200° C. for 2 hours to obtain the pure GNBs. The GNBs were then exfoliated to obtain a pristine GQD suspension.

Exfoliation may be achieved through the use of a superacid, in this instance chlorosulfonic acid, or via the Hummer's process, both described in Example 1 above. As described previously, superacid exfoliation does not produce defects on the graphene; however, the Hummer's process produced negatively charged graphene oxide sheets. In the Hummer's process, graphite is expanded in $HNO_3/H_2SO_4$ and then oxidized with $KMnO_4$. The negative-negative repulsion leads to exfoliation of the graphene oxide sheets that are functionalized with hydroxyl, epoxy, and carboxylic acid groups. These groups can be removed by reduction with hydrazine to produce graphene, although with remnant oxidized sites and defects (with oxy groups more than 1 per 100 $nm^2$).

Figure 16:
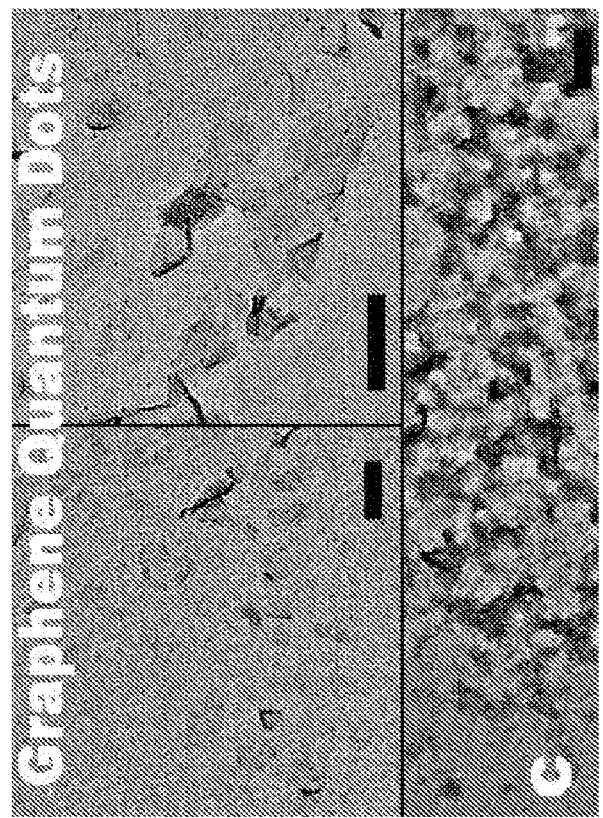
FIG. 16 is a TEM image of GQDs produced in accordance with one embodiment of the present invention.

The aforementioned ultramicrotomy process produced one HOPG cut per second. The HOPG (0.4 mm×0.4 mm×0.5 mm) was nanotomed over an area of 0.1×0.1 $mm^2$ and to a thickness of 0.5 mm. This cutting process produced approximately $2.5×10^7$ GNBs over the course of approximately 2.7 hours. Upon exfoliation of these GNBs, approximately $4×10^{13}$ GQDs of 20 $nm^2$ in size were produced (each GNB comprises $1.6×10^6$ GQDs). Thus, according to this process, approximately $1.48×10^{13}$ GQDs can be produced per hour. FIG. 15 is a TEM image confirming large-scale production of GQDs according to this process. It was noted that the GQDs undergo folding induced by π-π interfacing. FIG. 16 is a TEM image of a single square-shaped GQD produced according to this process having an approximate size of 50×50 nm.

This results of this experiment demonstrate the capability of the process to provide a high level of control over the size and shape of the GQDs. In addition to square-shaped GQDs, orientation of the cuts can be used to produce GQDs that are of different geometries including rectangular and triangular. Further, the techniques identified herein can also be used to produce more exotic geometries such as star shapes.

We claim:

1. A method of producing a plurality of graphene particulates comprising:
    providing a source of graphite and determining the crystallographic orientation of said source of graphite;
    using the determined crystallographic orientation of said source of graphite to determine a cutting angle for said source of graphite;
    cutting a plurality of graphite blocks from said source of graphite utilizing a cutting mechanism, said source of graphite being oriented relative to said cutting mechanism such that said cutting mechanism cuts said source of graphite at said cutting angle, wherein said graphite blocks have at least one dimension of less than 100 nm; and
    exposing said plurality of graphite blocks to an acid and causing said graphite blocks to exfoliate into a plurality of substantially uniform, electrically semiconductive graphene particulates having an armchair edge crystallographic orientation and a band gap,
    said cutting angle being set so as to provide said graphene particulates having said armchair edge crystallographic orientation upon exfoliation of said graphite blocks.

2. The method according to claim 1, wherein said cutting mechanism is an ultramicrotome.

3. The method according to claim 2, wherein said ultramicrotome utilizes a diamond knife having an edge radius of between about 1 to about 5 nm.

4. The method according to claim 1, wherein said source of graphite comprises highly oriented pyrolitic graphite (HOPG).

5. The method according to claim 1, wherein said acid is a superacid.

6. The method according to claim 1, wherein said acid is selected from the group consisting of chlorosulfonic acid, sulfuric acid, and mixtures thereof.

7. The method according to claim 1, wherein said graphite blocks have at least one dimension of less than 50 nm.

8. The method according to claim 1, wherein said plurality of graphene particulates is in the form of graphene nanoribbons.

9. The method according to claim 1, wherein said plurality of graphene particulates is in the form of graphene quantum dots.

10. The method according to claim 9, wherein said source of graphite comprises HOPG encased in a wax mold.

11. The method according to claim 10, wherein at least some of said plurality of graphite blocks comprise a portion of said wax mold adhering thereto, and said method further comprising removing said wax mold from said graphite blocks prior to exfoliation thereof.

12. The method according to claim 11, wherein said wax mold is removed from said graphite blocks by evaporation.

13. The method according to claim 1, wherein at least 90% of said graphene particulates have widths within ±3 nm from the mean width of said plurality of graphene particulates.

14. The method according to claim 13, wherein said graphene particulates have a mean width of less than 100 nm.

15. The method according to claim 14, wherein said graphene particulates have a mean width of less than 50 nm.

16. The method according to claim 1, wherein said graphite blocks are cut in the shape of a wedge.

17. The method according to claim 16, wherein said wedge comprises a wide end and a narrow end, the width of said wide end being about 10 nm and the width of said narrow end being about 2 nm.

18. The method according to claim 17, wherein upon exfoliation of said graphite blocks, a plurality of graphene particulates having a mean width of less than 10 nm is produced.

* * * * *